(12) United States Patent
Swanson et al.

(10) Patent No.: US 12,195,031 B2
(45) Date of Patent: Jan. 14, 2025

(54) SYSTEMS AND METHODS FOR DYNAMIC DATA MINING DURING DATA COLLECTION MISSIONS

(71) Applicant: Argo AI, LLC, Pittsburgh, PA (US)

(72) Inventors: Kevin Swanson, Detriot, MI (US); Christopher Attard, Saline, MI (US); Matthew Puchalski, Pittsburgh, PA (US); Daniel Swartz, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 210 days.

(21) Appl. No.: 17/654,247

(22) Filed: Mar. 10, 2022

(65) Prior Publication Data
US 2023/0286529 A1    Sep. 14, 2023

(51) Int. Cl.
| | | |
|---|---|---|
| B60W 60/00 | (2020.01) | |
| B60W 50/06 | (2006.01) | |
| G06F 16/26 | (2019.01) | |
| G06N 20/00 | (2019.01) | |

(52) U.S. Cl.
CPC .......... *B60W 60/00* (2020.02); *B60W 50/06* (2013.01); *G06F 16/26* (2019.01); *G06N 20/00* (2019.01)

(58) Field of Classification Search
CPC ....... B60W 60/00; B60W 50/06; G06F 16/26; G06N 20/00; G06V 20/58
See application file for complete search history.

(56) References Cited

U.S. PATENT DOCUMENTS

| | | |
|---|---|---|
| 6,850,153 B1 | 2/2005 | Murakami et al. |
| 9,194,168 B1 | 11/2015 | Lu et al. |
| 10,073,449 B1 | 9/2018 | Sait |
| 11,228,613 B2 * | 1/2022 | Chang .................... H04L 63/20 |
| 11,397,622 B2 | 7/2022 | Kiraly |
| 2003/0034873 A1 | 2/2003 | Chase |
| 2006/0218085 A1 | 9/2006 | Schuchardt |
| 2006/0265235 A1 | 11/2006 | Schuchardt |

(Continued)

FOREIGN PATENT DOCUMENTS

| | | | | |
|---|---|---|---|---|
| WO | WO-2019153082 A1 * | 8/2019 | .......... | G05D 1/0293 |
| WO | 2019213415 A1 | 11/2019 | | |
| WO | 2020228949 A1 | 11/2020 | | |

OTHER PUBLICATIONS

PCT/ISA/220 and PCT/ISA/237, International Search Report and Written Opinion for PCT/US2022/070560 dated Jun. 23, 2022, 15 pages.

(Continued)

*Primary Examiner* — Mary Cheung

(57) ABSTRACT

Disclosed herein are systems, methods, and computer program products for controlling data collection by resources. The methods comprise: receiving real-world data collected by the resources in accordance with data collection mission (DCM) parameters; receiving user defined DCM goal(s); updating goal(s) for DCM mission(s) based on the real-world data and the user defined DCM goal(s); modifying the data DCM parameter(s) based on the updated goal(s) and which ones of the resources are still available for DCMs; and causing data collection operations (which are currently being performed by the resource(s)) to change in accordance with the modified DCM parameter(s).

17 Claims, 10 Drawing Sheets

(56) References Cited

U.S. PATENT DOCUMENTS

| | | |
|---|---|---|
| 2008/0097731 A1 | 4/2008 | Lanes |
| 2014/0108080 A1 | 4/2014 | Mitchell |
| 2014/0156327 A1 | 6/2014 | Cai |
| 2015/0074013 A1 | 3/2015 | Schoonmaker et al. |
| 2015/0142518 A1 | 5/2015 | Farinha |
| 2015/0294403 A1 | 10/2015 | Chu et al. |
| 2016/0301698 A1 | 10/2016 | Katara et al. |
| 2016/0321665 A1 | 11/2016 | Thomas |
| 2017/0132421 A1 | 5/2017 | Unitt |
| 2017/0339031 A1* | 11/2017 | Hu .................... H04L 43/16 |
| 2018/0003512 A1* | 1/2018 | Lynch ............. G01C 21/3811 |
| 2018/0004202 A1 | 1/2018 | Onaga et al. |
| 2018/0025304 A1 | 1/2018 | Fisher |
| 2018/0188042 A1 | 7/2018 | Chen |
| 2018/0211541 A1 | 7/2018 | Rakah et al. |
| 2018/0216942 A1* | 8/2018 | Wang ............. G01C 21/3848 |
| 2018/0356239 A1 | 12/2018 | Marco |
| 2018/0356837 A1 | 12/2018 | Lisewski |
| 2019/0009794 A1* | 1/2019 | Toyoda .............. B60W 50/12 |
| 2019/0035282 A1 | 1/2019 | Feguson |
| 2019/0120640 A1 | 4/2019 | Ho et al. |
| 2019/0179336 A1 | 6/2019 | Colijn et al. |
| 2019/0222986 A1 | 7/2019 | Aitken |
| 2019/0228375 A1 | 7/2019 | Laury et al. |
| 2019/0266897 A1 | 8/2019 | Turato |
| 2019/0318028 A1 | 10/2019 | Cao |
| 2020/0033847 A1 | 1/2020 | Way |
| 2020/0089221 A1 | 3/2020 | Bilous |
| 2020/0116509 A1* | 4/2020 | Sakaguchi ......... G01C 21/3415 |
| 2020/0116515 A1 | 4/2020 | Chadha et al. |
| 2020/0118075 A1 | 4/2020 | Yang et al. |
| 2020/0128101 A1 | 4/2020 | Meng |
| 2020/0160709 A1 | 5/2020 | Ramot |
| 2020/0173808 A1 | 6/2020 | Beaurepaire et al. |
| 2020/0191589 A1 | 6/2020 | Tamai et al. |
| 2020/0209002 A1 | 7/2020 | Hou et al. |
| 2020/0241869 A1 | 7/2020 | Niemiec |
| 2020/0314089 A1 | 10/2020 | Iasynetskyi |
| 2020/0334637 A1 | 10/2020 | Turner |
| 2020/0344470 A1 | 10/2020 | Shen |
| 2020/0365015 A1 | 11/2020 | Nguyen |
| 2020/0372428 A1 | 11/2020 | Liu et al. |
| 2020/0380629 A1 | 12/2020 | Monteil et al. |
| 2020/0386558 A1 | 12/2020 | DeLizio |
| 2020/0396227 A1 | 12/2020 | Fan et al. |
| 2021/0033416 A1* | 2/2021 | Vladimerou ....... G01C 21/3658 |
| 2021/0035450 A1 | 2/2021 | Gao |
| 2021/0074163 A1 | 3/2021 | Robeson |
| 2021/0090025 A1 | 3/2021 | Bolton |
| 2021/0192405 A1 | 6/2021 | Bristow |
| 2021/0192962 A1 | 6/2021 | Bristow |
| 2021/0224413 A1 | 7/2021 | Gulas |
| 2021/0233390 A1* | 7/2021 | Georgiou ................ G08G 1/04 |
| 2021/0241625 A1 | 8/2021 | Elisha |
| 2021/0309248 A1* | 10/2021 | Choe ...................... G06N 3/04 |
| 2022/0057810 A1 | 2/2022 | Ha |
| 2022/0058309 A1 | 2/2022 | Safira |
| 2022/0063662 A1* | 3/2022 | Sprunk ................ G06V 20/58 |
| 2022/0292451 A1 | 9/2022 | Massey |
| 2022/0365530 A1 | 11/2022 | Foster |
| 2022/0412764 A1 | 12/2022 | Wu |
| 2023/0015884 A1 | 1/2023 | Cao |
| 2023/0290966 A1 | 1/2023 | Foster |
| 2023/0085943 A1 | 3/2023 | Karri |
| 2023/0086061 A1 | 3/2023 | Srivastava et al. |
| 2023/0156464 A1 | 5/2023 | Faccin |
| 2023/0205181 A1 | 6/2023 | Kishikawa |

OTHER PUBLICATIONS

Tanner, S. et al., On-board data mining, Jul. 30, 2009.

International Search Report and Writen Opinion for PCT/US2023/063542 dated May 30, 2023, 13 pages.

Distributed Multi-AUV Coordination in Naval Mine Countermeasure Missions Sanem Sariel, Tucker Balch and Jason Stack Jan. 30, 2006.

Karamanis et al., Vehicle redistribution in ride-sourcing market using convex minimum cost flows, 2021.

* cited by examiner

SYSTEMS AND METHODS FOR DYNAMIC DATA MINING DURING DATA COLLECTION MISSIONS

BACKGROUND

Modern day vehicles have at least one on-board computer and have internet/satellite connectivity. The software running on these on-board computers monitor and/or control operations of the vehicles. The vehicle also comprises monocular or stereo cameras and/or lidar detectors for detecting objects in proximity thereto. The cameras capture images of a scene. The lidar detectors generate lidar datasets that measure the distance from the vehicle to an object at a plurality of different times. These images and distance measurements can be used for detecting and tracking movements of the object, making predictions as to the object's trajectory, and planning paths of travel for the vehicle based on the predicted objects trajectory. Machine learning models can be used to facilitate object detection. Road maps may be used to plan paths of travel for the vehicle.

The machine learning models are trained and/or road maps are generated using data acquired by sensors mounted on vehicles during data collection missions. During the data collection missions, the current data acquisition strategies are semi-automated, using on-board, active data mining algorithms to capture recordings of various target objects of interest. The limitation to this strategy is that it requires human direction to tell the vehicles what target objects are to have data collected therefore and where to find the target objects. This incurs delays and inefficiencies in the data processing pipelines which is exacerbated as the fleet of data collection vehicles increases in number.

This document describes methods and systems that are directed to addressing the problems described above, and/or other issues.

SUMMARY

The present disclosure concerns implementing systems and methods for controlling data collection by a plurality of resources. The methods comprise performing the following operations by computing device(s): receiving real-world data collected by the resources in accordance with data collection mission parameters; receiving user defined data collection mission goal(s); updating goal(s) for data collection mission(s) based on the real-world data and the user defined data collection mission goal(s); modifying one or more of the data collection mission parameters based on the updated goal(s) for the data collection mission(s) and which ones of the resources are still available for data collection missions; and causing data collection operations (which are currently being performed by the resource(s)) to change in accordance with the data collection mission parameter(s) which was(were) modified.

In some scenarios, the goal(s) for the data collection mission(s) is(are) updated by generating at least one value representing a difference between a first parameter of the data collection mission parameters and a second parameter specified in the user defined data collection mission goal(s). Each of the first and second parameters may comprise a number of targets of a given target object type for which data should or is to be collected.

The methods may also comprise generating a score based on the value(s) and/or a total number of targets for all target object types for which data is be collected. Each value may be weighted relative to at least one other value representing a difference between a third parameter of the data collection mission parameters and a fourth parameter specified in the user defined data collection mission goal(s). The methods may further comprise: generating a prioritization of target object types based on the score; dividing target objects between the resources based on at least the prioritization; and modifying the data collection mission parameter(s) in accordance with the dividing.

In those or other scenarios, the real-world data collected by the resource(s) may be used to (i) train machine learning model(s) to detect objects in perception data or (ii) generate map(s). The machine learning model(s) and/or map(s) may be used to control movement of robotic system(s) (for example, autonomous vehicle(s)).

The implementing systems can comprise: a processor; and a non-transitory computer-readable storage medium comprising programming instructions that are configured to cause the processor to implement a method for operating an automated system. The above described methods can also be implemented by a computer program product comprising memory and programming instructions that are configured to cause a processor to perform operations.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Figure 1:
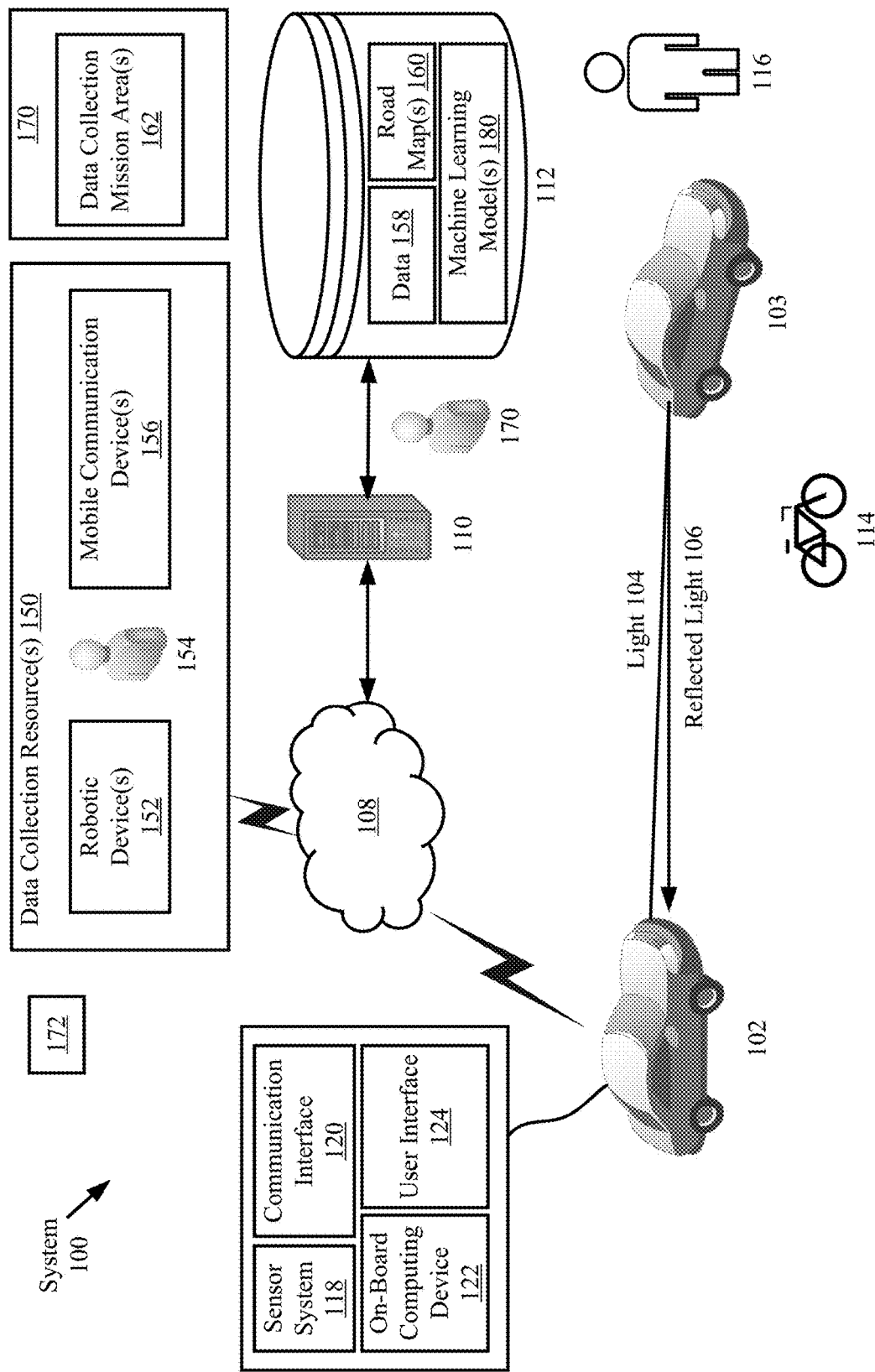
FIG. 1 is an illustration of an illustrative system.

In current autonomous vehicle systems, perception data and road maps are used to facilitate path planning and/or driving operations. Machine learning models are trained to detected objects in the perception data. Trajectories for the detected objects are then predicted and used to control driving operations of an autonomous vehicle. The training of the machine learning models is achieved using data acquired by sensors mounted on vehicles during data collection missions (DCMs). Similarly, the road maps are generated using the data collected during the same or different DCMs. During the DCMs, the current data acquisition strategies are semi-automated, using on-board, active data mining algorithms to capture recordings of various targets of interest (for example, buses, pedestrians, animals, cyclists, traffic lights, traffic signs, parking lots, other road features, etc.). The limitation to this strategy is that it requires human direction to tell the vehicle what target objects are to have data collected therefor and where to find the target objects. This incurs delays and inefficiencies in the machine learning model training and/or map generation process(es) which is exacerbated as the fleet of data collection vehicles increases in number. The present solution addresses these and other issues.

The present solution links a machine learning model training pipeline and/or map generation pipeline to mission control for facilitating the dynamic updating of data mining objectives while the DCMs are being performed by the vehicles. The human input to the system is in setting the overall data collection goals and prioritization as an input to the pipeline(s). From there, the pipeline(s) determines the biggest needs, tunes its data mining parameters, and sends information relating to these operations to mission control. Mission control then uses this guidance to direct the fleet on a per-vehicle basis towards areas and target objects of interest in real time. The dynamically controlled fields can include, but are not limited to, target features (for example, cars, bikes, animals, traffic lights, traffic signs, etc.), location, time of day, and weather.

The present solution reduces human input at multiple steps of the flow and allows more active modification of DCMs. For example, if it rains during a DCM, then the vehicle can be dynamically re-routed to collect different data (for example, to collect data associated with traffic signs rather than pedestrians). The vehicle can once again be caused to perform prioritized operations when the rain stops (for example, to start once again collecting data relating to pedestrians). Without dynamically controlled data mining, the vehicle would need to return to the terminal (or depot) for a mission software update or change. Alternatively, a human may intervene and modify parameters on a vehicle-by-vehicle basis remotely.

The advantages of the present solution have greater impact as the fleet increases in size. For a small fleet of data collection vehicles, human input can be done with little effort. However, as the fleet grows to hundreds of vehicles across multiple geographic locations with multiple priorities, scaling human resources would be required proportional to the scaling vehicle resources. The present solution resolves the need for scaling human resources.

The present solution generally concerns implementing systems and methods for collecting, while a vehicle is traversing roads, data that can be used to at least (i) train machine learning models to detect objects and/or (ii) generate and/or update road map(s). The methods involve: scheduling a DCM for a geographic location (for example, Miami, Florida); and allocating resources for the DCM. The resources can include operator(s), vehicle(s), and/or robotic system(s). This scheduling can be performed manually or automatically by a computing device. The automatic allocations of resource(s) can be based on one or more factors. The factors include, but are not limited to, time of day, geographic location(s) of resource(s), geography, and/or partnership priorities. A partnership priority can include, for example, a vehicle priority to provide support for a sporting event and collect data in an environment around the sporting event's location.

Next, a map manager determines, selects or identifies one or more Data Collection Mission Areas (DCMAs) within the geographic location (for example, Miami, Florida) that are to be covered by the allocated resource(s). Next, a routing algorithm performs operations to generate first route(s) to be traversed by the allocated resource(s) in each DCMA identified by the map manager. The routing algorithm also performs operations to generate second route(s) to be traversed by allocated resource(s) from the terminal(s) (or depot(s)) to the DCMA(s). For example, a second route can include a route to be traversed by a vehicle from a given terminal (or depot) to a start location of a given first route through a respective DCMA. The present solution is not limited to the particulars of this example.

The resource(s) is(are) then automatedly dispatched from the terminal(s) (or depot(s)) to the DCMA(s). Accordingly, the resource(s) follow the second route(s) until reaching starting location(s) for the first route(s). For example, each allocated vehicle performs driving operations to follow a respective second route. Next, the first route(s) is(are) then implemented by the resource(s).

The resource(s) collect data while traversing the first route(s). The resource(s) perform the data collection in accordance with current mission parameters. The current mission parameters can include, but are not limited to, target object types and number of target objects for each type for which data should be collected. The data collection is discontinued when a vehicle or other robotic system has completed traversal of a first route and/or in response to another trigger event (for example, the operator has performed a user-software interaction for marking the DCM as being completed).

During the DCM, the system may receive user defined DCM goals. The DCM goals include, but are not limited to, user defined mission parameters. The user defined mission parameters can include, but are not limited to, target object types and number of target objects for each type for which data should be collected. For example, a DCM goal can be to collect data for one hundred vehicle targets, one thousand bus targets, two thousand pedestrian targets and five hundred traffic light targets. The present solution is not limited to the particulars of this example.

The user defined mission parameters are respectively compared to the current mission parameters to determine differences therebetween. More specifically, a difference value may be generated for each target object type that is common in the current mission parameters and the user defined mission parameters. Each difference value may represent a difference between a first number of targets defined in the current mission parameters (for example, one thousand pedestrians) and a second number of targets defined in the user defined mission parameters (for example, twenty thousand pedestrians). For example, if the first number of targets is one thousand pedestrians and the second number of targets is twenty thousand, then the difference value is nineteen thousand for pedestrian targets. The present solution is not limited to the particulars of this example.

The difference values may be weighted to generate a score for each target object type identified in the user defined DCM goals. For example, the score for pedestrian targets may be 67%, while the score for traffic light targets may be 30% and the score for traffic sign targets may be 3%. The present solution is not limited to the particulars of this example. The scores are used to determine a prioritization for the target object types. The target object types can be prioritized in an order from the greatest score to the lowest score. For example, pedestrian targets with an associated score of 67% may have a higher priority than traffic light targets with an associated score of 30%, and traffic light targets may have a higher priority than traffic sign targets with an associated score of 3%. The present solution is not limited to the particulars of this example.

The targets are then divided between the allocated resources based on the prioritization and/or other factors which may or may not be weighted. This division can be achieved, for example, using a Convolutional Neural Network (CNN), cost function or other function. The other factors can include, but are not limited to, time of day, geographic location, geography, and/or partnership priorities (for example, a vehicle priority is to provide support for a sporting event and collect data around this event). For example, a fleet has fifty-eight vehicles of which forty vehicles can be used for primary business needs (for example, revenue generation via ride sharing and/or package delivery) and eighteen vehicles can be used for secondary business needs (for example, machine learning model training and/or map generation). The targets are divided between the eighteen vehicles: traffic lights are assigned to ten vehicles; pedestrians in a first city are assigned to five vehicles; pedestrians in a second city are assigned to two vehicles; and traffic signs in the second city are assigned to one vehicle. The present solution is not limited to the particulars of this example.

The DCM parameters are dynamically modified in accordance with how the targets are divided between the resources that can be used for secondary business needs. The modified DCM parameters are respectively communicated to the resources. The resources may selectively adjust their mission operations based on the modified DCM parameters. This process of dynamic mission operation adjustment can be repeated any number of times during the DCMs.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, semi-autonomous vehicles, manually operated vehicles, teleoperated vehicles, watercraft, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Notably, the present solution is being described herein in the context of autonomous vehicles, machine learning model training, object detection and map generation. However, the present solution is not limited to such applications. The present solution can be used in other applications such as robotic applications (for example to control movements of articulating arms) and/or system performance applications.

FIG. 1 illustrates an example system 100, in accordance with aspects of the disclosure. System 100 comprises data collection resource(s) 150 configured to collect data while traversing DCMA(s) 162 in accordance with a novel data collection process. The novel data collection process will be discussed in detail below. The collected data 158 may be stored in a datastore 112 and/or used by computing device(s) 110 to (i) train machine learning models 180 to detect objects of various types using perception data and/or (ii) generate and/or update road map(s) 160. The trained machine learning models 180 and/or the road map(s) 160 is(are) then used to facilitate motion or movement to of vehicle 102.

The motion or movement may cause vehicle 102 to travel along a road in a semi-autonomous or autonomous manner. Vehicle 102 is also referred to herein as an AV 102. The AV 102 can include, but is not limited to, land vehicles (as shown in FIG. 1), aircraft, watercraft, subterrenes, spacecraft, drones and/or an articulating arm (for example, with a gripper at a free end). As noted above, except where specifically noted this disclosure is not necessarily limited to AV embodiments, and it may include non-autonomous vehicles in some embodiments.

AV 102 is generally configured to detect objects 103, 114, 116 in proximity thereto. The objects can include, but are not limited to, a vehicle 103, a cyclist 114 (such as a rider of a bicycle, electric scooter, motorcycle, or the like) and/or a pedestrian 116.

As illustrated in FIG. 1, the AV 102 may include a sensor system 118, an on-board computing device 122, a communications interface 120, and a user interface 124. AV 102 may further include certain components (as illustrated, for example, in FIG. 2) included in vehicles, which may be controlled by the on-board computing device 122 using a variety of communication signals and/or commands, such as, for example, acceleration signals or commands, deceleration signals or commands, steering signals or commands, braking signals or commands, etc.

Figure 2:
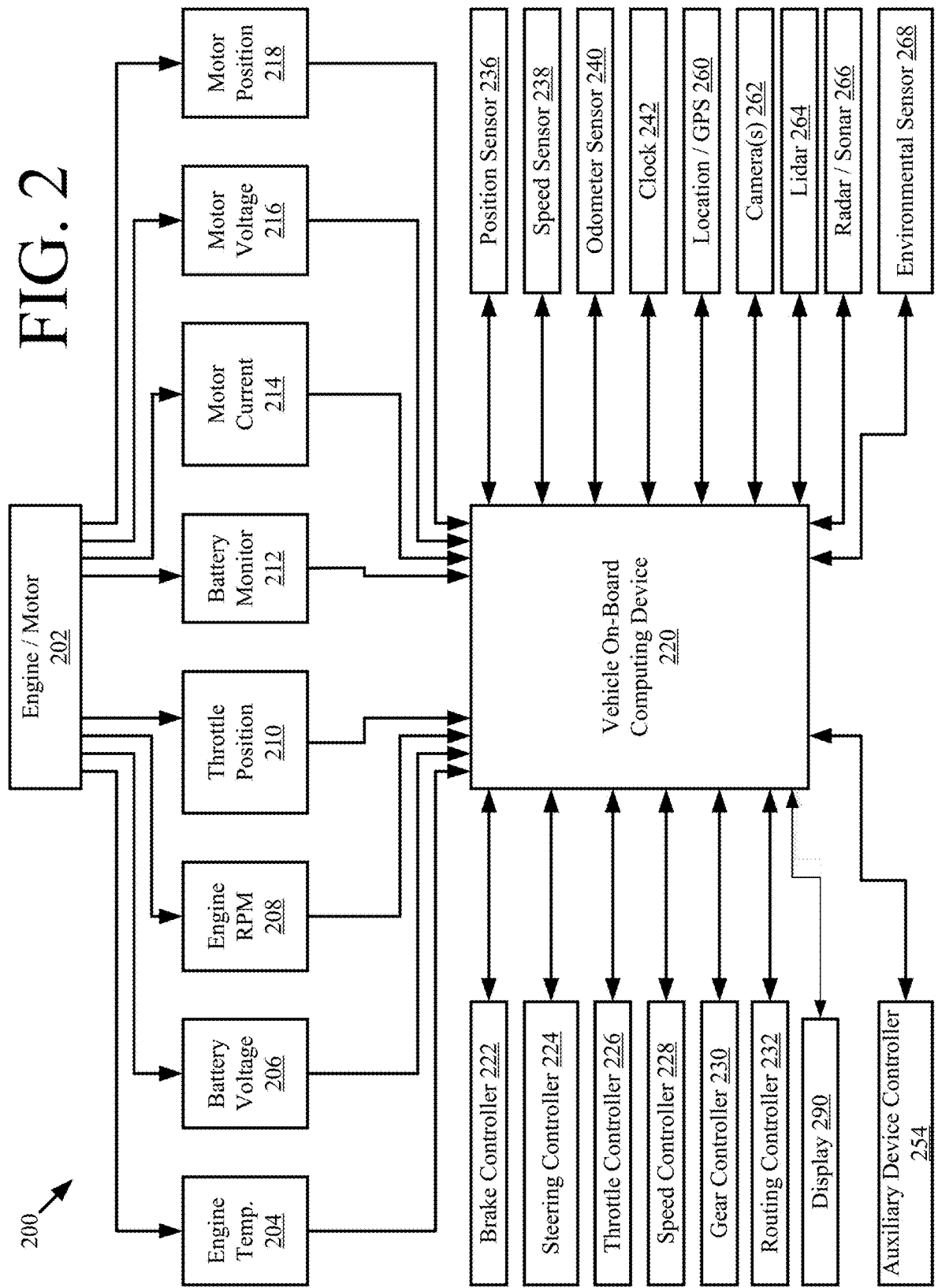
FIG. 2 is an illustration of an illustrative architecture for a vehicle.

The sensor system 118 may include one or more sensors that are coupled to and/or are included within the AV 102, as illustrated in FIG. 2. For example, such sensors may include, without limitation, a lidar system, a RADAR system, a laser detection and ranging (LADAR) system, a sound navigation and ranging (SONAR) system, camera(s) (for example, visible spectrum camera(s), infrared camera(s), etc.), temperature sensors, position sensors (for example, a global positioning system (GPS), etc.), location sensors, fuel sensors, motion sensors (for example, an inertial measurement unit (IMU), etc.), humidity sensors, occupancy sensors, and/or the like. The sensors are generally configured to generate sensor data. The sensor data can include information that describes the location of objects within the surrounding environment of the AV 102, information about the environment itself, information about the motion of the AV 102, information about a route of the vehicle, and/or the like. As AV 102 travels over a surface (for example, a road), at least some of the sensors may collect data pertaining to the surface.

As will be described in greater detail, AV 102 may be configured with a lidar system (for example, lidar system 264 of FIG. 2). The lidar system may be configured to transmit a light pulse 104 to detect objects located within a distance or range of distances of AV 102. Light pulse 104 may be incident on one or more objects (for example, AV 103) and be reflected back to the lidar system. Reflected light pulse 106 incident on the lidar system may be processed to determine a distance of that object to AV 102. The reflected light pulse 106 may be detected using, in some scenarios, a photodetector or array of photodetectors positioned and configured to receive the light reflected back into the lidar system. Lidar information, such as detected object data, is communicated from the lidar system to the on-board computing device 122. The AV 102 may also communicate lidar data to a remote computing device 110 (for example, a cloud processing system) over a network 108. Computing device 110 may be configured with one or more servers to process one or more processes of the technology described herein. Computing device 110 may also be configured to communicate data/instructions to/from AV 102 over network 108, to/from server(s) and/or database(s) 112.

It should be noted that the lidar systems for collecting data pertaining to the surface may be included in systems other than the AV 102 such as, without limitation, other vehicles (autonomous or driven), robots, satellites, etc.

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from the database 112. Database 112 may be configured to store and supply raw data, indexed data, structured data, map data, program instructions or other configurations as is known.

The communications interface 120 may be configured to allow communication between AV 102 and external systems, such as, for example, external devices, sensors, other vehicles, servers, data stores, databases, etc. The communications interface 120 may utilize any now or hereafter known protocols, protection schemes, encodings, formats, packaging, etc. such as, without limitation, Wi-Fi, an infrared link, Bluetooth, etc. The user interface 124 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 120 over communication links such as those known as vehicle-to-vehicle, vehicle-to-object or other V2X communication links. The term "V2X" refers to a communication between a vehicle and any object that the vehicle may encounter or affect in its environment.

As noted above, the AV 102 may detect objects 103, 114, 116 in proximity thereto. Such object detections are facilitated using the sensor data generated by the sensor system 118 (for example, lidar datasets generated by an onboard lidar detector). The sensor data is processed by the onboard computing device 122 of the AV 102 and/or by the remote computing device 110 to obtain one or more predicted trajectories for the object given the sensor data. The predicted trajectories for the object may then be used to generate a trajectory for the AV 102. The AV 103 may then be caused by the on-board computing device to follow the trajectory.

FIG. 2 illustrates a system architecture 200 for a vehicle, in accordance with aspects of the disclosure. Vehicles 102 and/or 103 of FIG. 1 can have the same or similar system architecture as that shown in FIG. 2. Thus, the following discussion of system architecture 200 is sufficient for understanding vehicle(s) 102, 103 of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, the system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Revolutions Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors 218 such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device 220, it may be a separate device, or multiple clocks may be available.

The vehicle also will include various sensors that operate to gather information about the environment in which the vehicle is traveling. These sensors may include, for example: a location sensor 260 (for example, a GPS device); object detection sensors such as one or more cameras 262; a lidar sensor system 264; and/or a RADAR and/or SONAR system 266. The sensors also may include environmental sensors 268 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 220. The vehicle on-board computing device 220 may be implemented using the computer system of FIG. 4. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the vehicle on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors to the vehicle on-board computing device 220. The object detection information and/or captured images are processed by the vehicle on-board computing device 220 to detect objects in proximity to the vehicle. Any known or to be known technique for making an object detection based on sensor data and/or captured images can be used in the embodiments disclosed in this document.

Lidar information is communicated from lidar system 264 to the vehicle on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle. The manner in which the object detections are made by the vehicle on-board computing device 220 includes such capabilities detailed in this disclosure.

In addition, the system architecture 200 may include an onboard display device 290 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 220 may include and/or may be in communication with a routing controller 232 that generates a navigation route from a start position to a destination position for an autonomous vehicle. The routing controller 232 may access a map data store to identify possible routes and road segments that a vehicle can travel on to get from the start position to the destination position. The routing controller 232 may score the possible routes and identify a preferred route to reach the destination. For example, the routing controller 232 may generate a navigation route that minimizes Euclidean distance traveled or other cost function during the route and may further access the traffic information and/or estimates that can affect an amount of time it will take to travel on a particular route. Depending on implementation, the routing controller 232 may generate one or more routes using various routing methods, such as Dijkstra's algorithm, Bellman-Ford algorithm, or other algorithms. The routing controller 232 may also use the traffic information to generate a navigation route that reflects expected conditions of the route (for example, current day of the week or current time of day, etc.), such that a route generated for travel during rush-hour may differ from a route generated for travel late at night. The routing controller 232 may also generate more than one navigation route to a destination and send more than one of these navigation routes to a user for selection by the user from among various possible routes.

In some scenarios, the vehicle on-board computing device 220 may determine perception information of the surrounding environment of the vehicle. Based on the sensor data provided by one or more sensors and location information that is obtained, the vehicle on-board computing device 220 may determine perception information of the surrounding environment of the vehicle. The perception information may represent what an ordinary driver would perceive in the surrounding environment of a vehicle. The perception data may include information relating to one or more objects in the environment of the vehicle. For example, the vehicle on-board computing device 220 may process sensor data (for example, lidar data, RADAR data, camera images, etc.) in order to identify objects and/or features in the environment of vehicle. The objects may include, but is not limited to, traffic signals, roadway boundaries, other vehicles, pedestrians, and/or obstacles. The vehicle on-board computing device 220 may use any now or hereafter known object recognition algorithms, video tracking algorithms, and computer vision algorithms (for example, track objects frame-to-frame iteratively over a number of time periods) to determine the perception.

In those or other scenarios, the vehicle on-board computing device 220 may also determine, for one or more identified objects in the environment, the current state of the object. The state information may include, without limitation, for each object: a current location; a current speed; an acceleration; a current heading; a current pose; a current shape, size and/or footprint; an object type or classification (for example, vehicle. pedestrian, bicycle, static object, or obstacle); and/or other state information.

The vehicle on-board computing device 220 may perform one or more prediction and/or forecasting operations. For example, the vehicle on-board computing device 220 may predict future locations, trajectories, and/or actions of one or more objects. For example, the vehicle on-board computing device 220 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the vehicle on-board computing device 220 may predict whether the object will likely move straight forward or make a turn. If the perception data indicates that the intersection has no traffic light, the vehicle on-board computing device 220 may also predict whether the vehicle may have to fully stop prior to entering the intersection.

In those or other scenarios, the vehicle on-board computing device 220 may determine a motion plan for the vehicle. For example, the vehicle on-board computing device 220 may determine a motion plan for the vehicle based on the perception data and/or the prediction data. Specifically, given predictions about the future locations of proximate objects and other perception data, the vehicle on-board computing device 220 can determine a motion plan for the vehicle that best navigates the vehicle relative to the objects at their future locations.

In those or other scenarios, the vehicle on-board computing device 220 may receive predictions and make a decision regarding how to handle objects and/or actors in the environment of the vehicle. For example, for a particular actor (for example, a vehicle with a given speed, direction, turning angle, etc.), the vehicle on-board computing device 220 decides whether to overtake, yield, stop, and/or pass based on, for example, traffic conditions, map data, state of the autonomous vehicle, etc. Furthermore, the vehicle on-board computing device 220 also plans a path for the vehicle to travel on a given route, as well as driving parameters (for example, distance, speed, and/or turning angle). That is, for a given object, the vehicle on-board computing device 220 decides what to do with the object and determines how to do it. For example, for a given object, the vehicle on-board computing device 220 may decide to pass the object and may determine whether to pass on the left side or right side of the object (including motion parameters such as speed). The vehicle on-board computing device 220 may also assess the risk of a collision between a detected object and the vehicle. If the risk exceeds an acceptable threshold, it may determine whether the collision can be avoided if the vehicle follows a defined vehicle trajectory and/or implements one or more dynamically generated emergency maneuvers in a time period (for example, N milliseconds). If the collision can be avoided, then the vehicle on-board computing device 220 may execute one or more control instructions to perform a cautious maneuver (for example, mildly slow down, accelerate, change lane, or swerve). In contrast, if the collision cannot be avoided, then the vehicle on-board computing device 220 may execute one or more control instructions for execution of an emergency maneuver (for example, brake and/or change direction of travel).

As discussed above, planning and control data regarding the movement of the vehicle is generated for execution. The vehicle on-board computing device 220 may, for example: control braking via a brake controller; direction via a steering controller; speed and acceleration via a throttle controller (in a gas-powered vehicle) or a motor speed controller (such as a current level controller in an electric vehicle); change gears via a differential gear controller (in vehicles with transmissions); and/or control other operations via other controllers.

Figure 3:
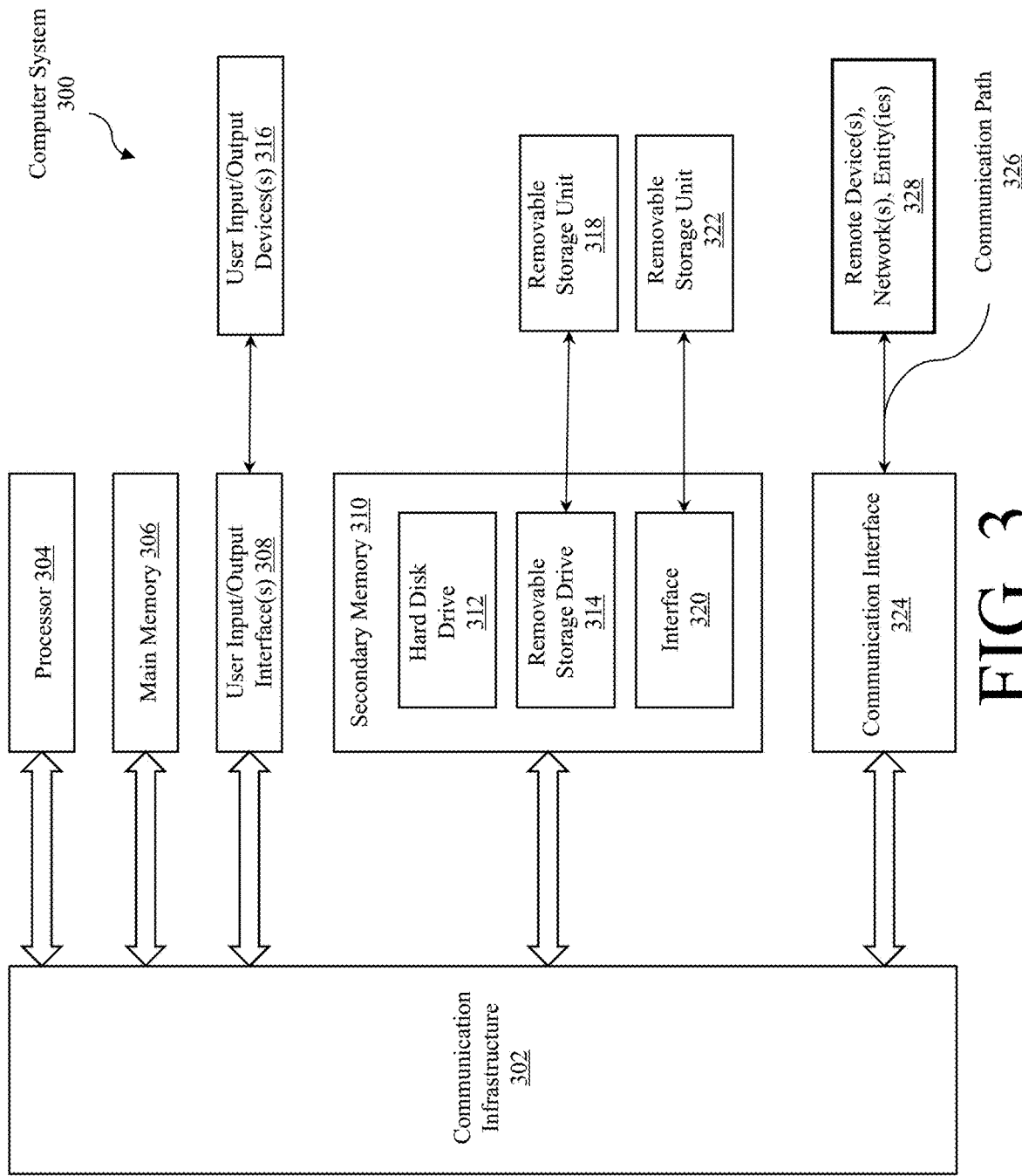
FIG. 3 is an illustration of an illustrative computing device.

The present solution can be implemented, for example, using one or more computer systems, such as computer system 300 shown in FIG. 3. Computer system 300 can be any computer capable of performing the functions described herein. The on-board computing device 122 of FIG. 1, computing device 110 of FIG. 1, robotic device(s) 152 of FIG. 1, mobile communication device(s) 156 of FIG. 1, and/or the vehicle on-board computing device 220 of FIG. 2 may be the same as or similar to computing system 300. As such, the discussion of computing system 300 is sufficient for understanding the devices 110, 122, 152, 156 and 220 of FIGS. 1-2.

Computing system 300 may include more or less components than those shown in FIG. 3. However, the components shown are sufficient to disclose an illustrative solution implementing the present solution. The hardware architecture of FIG. 3 represents one implementation of a representative computing system configured to operate a vehicle, as described herein. As such, the computing system 300 of FIG. 3 implements at least a portion of the method(s) described herein.

Some or all components of the computing system 300 can be implemented as hardware, software and/or a combination of hardware and software. The hardware includes, but is not limited to, one or more electronic circuits. The electronic circuits can include, but are not limited to, passive components (for example, resistors and capacitors) and/or active components (for example, amplifiers and/or microprocessors). The passive and/or active components can be adapted to, arranged to and/or programmed to perform one or more of the methodologies, procedures, or functions described herein.

Computer system 300 includes one or more processors (also called central processing units, or CPUs), such as a processor 304. Processor 304 is connected to a communication infrastructure or bus 302. One or more processors 304 may each be a graphics processing unit (GPU). In some scenarios, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 316, such as monitors, keyboards, pointing devices, etc., that communicate with communication infrastructure 302 through user input/output interface(s) 308. Computer system 300 further includes a main or primary memory 306, such as random access memory (RAM). Main memory 306 may include one or more levels of cache. Main memory 306 has stored therein control logic (i.e., computer software) and/or data.

One or more secondary storage devices or memories 310 may be provided with computer system 300. Secondary memory 310 may include, for example, a hard disk drive 312 and/or a removable storage device or drive 314. Removable storage drive 314 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be an external hard drive, a universal serial bus (USB) drive, a memory card such as a compact flash card or secure digital memory, a floppy disk, a magnetic tape, a compact disc, a DVD, an optical storage disk, and/or any other computer data storage device. Removable storage drive 314 reads from and/or writes to removable storage unit 314 in a well-known manner.

In some scenarios, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In some scenarios, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 300, main memory 306, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use the present solution using data processing devices, computer systems and/or computer architectures other than that shown in FIG. 3. In particular, the present solution can operate with software, hardware, and/or operating system implementations other than those described herein.

Figure 4:
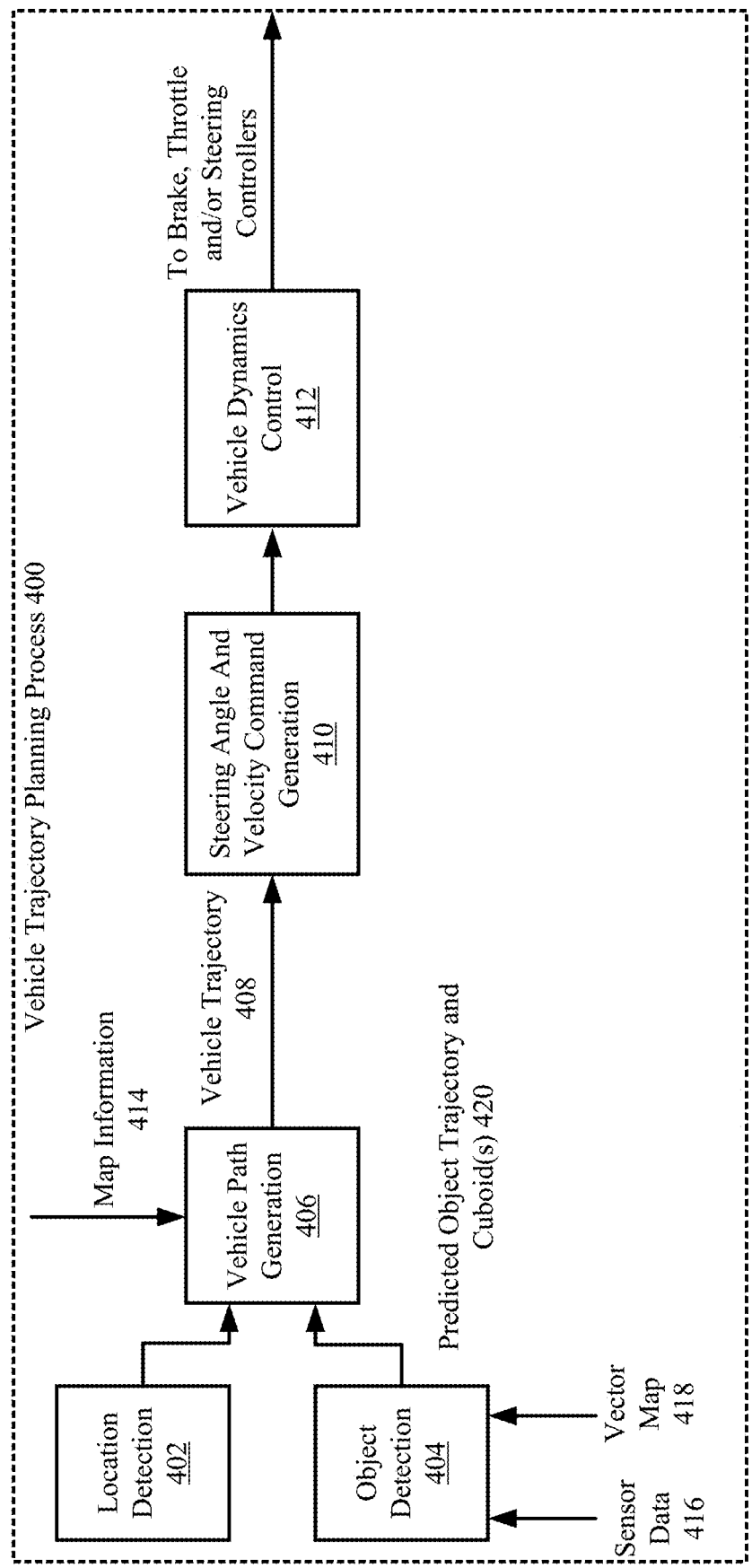
FIG. 4 provides a block diagram of an illustrative vehicle trajectory planning process.

FIG. 4 provides a block diagram that is useful for understanding how motion or movement of an AV is achieved in accordance with the present solution. All of the operations performed in blocks 402-412 can be performed by the on-board computing device (for example, on-board computing device 122 of FIGS. 1 and/or 220 of FIG. 2) of a vehicle (for example, AV 102 of FIG. 1).

In block 402, a location of the AV (for example, AV 102 of FIG. 1) is detected. This detection can be made based on sensor data output from a location sensor (for example, location sensor 260 of FIG. 2) of the AV. This sensor data can include, but is not limited to, GPS data. The detected location of the AV is then passed to block 406.

In block 404, an object (for example, vehicle 103 of FIG. 1) is detected within proximity of the AV (for example, <100+ meters). This detection is made based on sensor data output from a camera (for example, camera 262 of FIG. 2) of the AV and/or a lidar system (for example, lidar system 264 of FIG. 2) of the AV. For example, image processing is performed to detect an instance of an object of a certain class (for example, a vehicle, cyclist or pedestrian) in an image. The image processing/object detection can be achieved in accordance with any known or to be known image processing/object detection algorithm.

Additionally, a predicted trajectory is determined in block 404 for the object. The object's trajectory is predicted in block 404 based on the object's class, cuboid geometry(ies), cuboid heading(s) and/or contents of a map 418 (for example, sidewalk locations, lane locations, lane directions of travel, driving rules, etc.). The manner in which the cuboid geometry(ies) and heading(s) are determined will become evident as the discussion progresses. At this time, it should be noted that the cuboid geometry(ies) and/or heading(s) are determined using sensor data of various types (for example, 2D images, 3D lidar point clouds) and a vector map 418 (for example, lane geometries). Techniques for predicting object trajectories based on cuboid geometries and headings include, but are not limited to, predicting that the object is moving on a linear path in the same direction as the heading direction of a cuboid. The predicted object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 420 specifying the object's predicted trajectory, the cuboid geometry(ies)/heading(s) is provided to block 406. In some scenarios, a classification of the object is also passed to block 406. In block 406, a vehicle trajectory is generated using the information from blocks 402 and 404. Techniques for determining a vehicle trajectory using cuboids may include, but are not limited to, determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 420 can be determined based on the location information from block 402, the object detection information from block 404, and/or map information 414 (which is pre-stored in a data store of the vehicle). The map information 414 may include, but is not limited to, all or a portion of road map(s) 160 of FIG. 1. The vehicle trajectory 420 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 420 is then provided to block 408.

In block 408, a steering angle and velocity command is generated based on the vehicle trajectory 420. The steering angle and velocity command are provided to block 410 for vehicle dynamics control, i.e., the steering angle and velocity command causes the AV to follow the vehicle trajectory 408.

Figure 5:
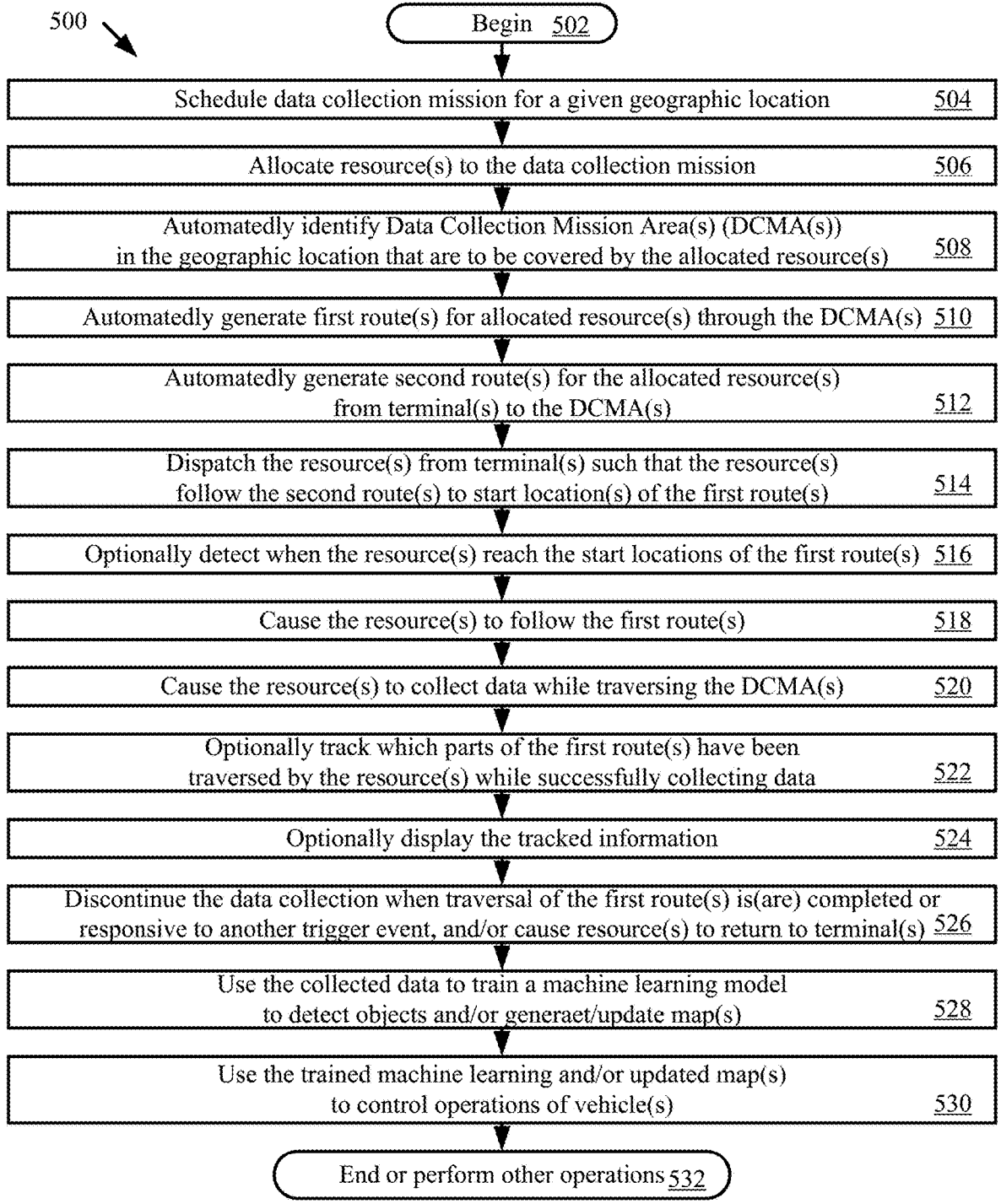
FIG. 5 provides a flow diagram of an illustrative method for collecting data and/or using the same to control operations of vehicle(s) and/or other robotic device(s).

FIG. 5 provides a flow diagram of an illustrative method 500 for collecting data (for example, data 158 of FIG. 1) and/or using the same to control operations of vehicle(s) (for example, vehicle 102 of FIG. 1) and/or other robotic device(s). Method 500 begins with 502 and continues with 504 where a DCM is scheduled for a geographic location (for example, geographic area 170 of FIG. 1). The geographic location can include, but is not limited to, street(s), road(s), city block(s), city(ies), county(ies), state(s) and/or country(ies). The DCM may be scheduled (i) manually by an individual (for example, individual 170 of FIG. 1) via user-software interactions using a computing device (for example, computing device 110 of FIG. 1) and/or (ii) automatedly by the computing device in accordance with predefined rules that consider criteria. The criteria can include, but is not limited to, a time of day, a time of year, geographic location(s) of resource(s), last time(s) when machine learning model(s) was(were) trained, time(s) when data was collected, data accuracy confidence score(s) for portion(s) of a given road map, amount(s) of unknown information for portion(s) of a given road map, type(s) of change(s) to road feature(s) and/or structure(s), extent or degree of change(s) to road feature(s) and/or structure(s), and/or known location(s) of construction that may have an impact on a vehicle's ability to traverse lane(s), street(s) and/or road(s). For example, a rule may be that a DCM for a given city is to be performed during weekday nighttime hours in a month with relatively low traffic history (for example, June). The rule may be selectively applied when (i) a machine learning model needs to be generated or updated to improve its accuracy for detecting objects using perception data, (ii) there has been a change to road feature(s)/structure(s) of particular type(s), and/or (iii) a given road map needs to be generated for the city or updated to improve the accuracy and/or level of detail for corresponding portion(s) of the map. The present solution is not limited to the particulars of this example.

Resource(s) is(are) allocated to the DCM in 506. The resource(s) can include, but is(are) not limited to, robotic device(s) (for example, robotic device(s) 152 of FIG. 1), individual(s) (for example, individual(s) 154 of FIG. 1) and/or mobile communication device(s) (for example, mobile communication device(s) 156 of FIG. 1). The robotic device(s) may comprise, in some scenarios, vehicle(s) that is(are) the same as or similar to vehicle 102 of FIG. 1. The individual(s) 154 may comprise occupant(s) of the robotic device(s) and/or operator(s) of the robotic device(s). The mobile communication device(s) can include, but is(are) not limited to, portable computer(s) and/or smart device(s) (for example, smart phone(s) and/or watch(es)). The resources can be allocated manually or automatically by the computing device. The automatic allocations of resource(s) can be based on one or more factors. The factors include, but are not limited to, time of day, geographic location(s) of resource(s), geography, and/or partnership priorities. A partnership priority can include, for example, a vehicle priority to provide support for a sporting event and collect data in an environment around the sporting event's location.

In 508, the computing device performs operations to automatedly identify one or more DCMAs (for example, DCMA(s) 162 of FIG. 1) within the geographic area that are to be covered by the allocated resource(s). Each DCMA may comprise the entire geographic area for which the DCM was scheduled or a portion of the geographic area for which the DCM was scheduled.

Any number of DCMAs can be identified in accordance with a given application. For example, the DCMA(s) can be identified based on a mile or range setting for DCMAs (for example, 3 miles), a total number of DCMAs for the geographic area, location(s) of terminal(s)/depot(s) where the allocated resource(s) reside, DCMA priorities, road feature priorities (for example, intersection priorities), changes to road structures (for example, a new or additional lane has been added to a road), changes to road features (for example, lights changed or new lights added at intersection(s)), length of time and/or mission breaks. For example, the geographic area includes Miami Florida which is 55.25 $mi^2$ and a mile/range setting for DCMAs is 5 $mi^2$. Thus, eleven DCMAs are identified by the computing device. The DCMAs are prioritized in accordance with DCMA priorities, road feature priorities, and/or a total number of road structures/features thereof that have been changed. Additionally, or alternatively, if vehicle availability exists for a certain amount of time, then the DCMAs are selected which could be completed or otherwise performed within this amount of time. The DCMAs can further be selected based on how many mission breaks of a threshold duration can occur during a respective mission. The present solution is not limited to the particulars of this example.

The DCMAs may comply with rules. For example, one rule may be that a DCMA can or cannot include any unmapped parking lots, alleys and/or driveways. Other rules may be that the DCMAs fall within overall size limits, cannot include roads with speed limits exceeding threshold values, and/or cannot include unsupported road features (for example, tunnels or bidirectional roads). The present solution is not limited to the particulars of this example.

In 510, the computing device performs operations to generate first route(s) to be traversed by the allocated resource(s) in each DCMA. In some scenarios, each first route comprises an efficient route that would allow a resource (for example, robotic device 152 of FIG. 1) to (i) traverse two-way roads, lanes or corridors within the DCMA at least one time in each direction and/or (ii) traverse one-way roads, lanes or corridors within the DCMA at least one time in a corresponding direction. Each first route may comply with rule(s). For example, a rule states that a route is not to include any turns into (i) areas outside of the DCMA, (ii) parking lots, (iii) alleys and/or (iv) driveways. Another rule states that a route is to include a maximized number of right or left turns to create loops that would enhance alignment of sensor data and/or map data. Yet another rule states that a route should cause a vehicle to travel straight through traffic lights when possible. Another rule may state that right turns should be performed first and left turns should be performed second or otherwise at the end of a mission. The present solution is not limited to the particulars of these examples.

In 512, the computing device performs operations to generate second route(s) to be traversed by allocated resource(s) from terminal(s) (or depot(s)) (for example, terminal(s) 172 of FIG. 1) to the DCMA(s). For example, a second route can include a route to be traversed by a resource from a given terminal (or depot) to a start location of a given first route through a respective DCMA. The present solution is not limited to the particulars of this example. The second route(s) can be generated using any known or to be known route generation technique between a starting place/location and a destination place/location.

Upon completing 512, the resource(s) is(are) then automatedly dispatched by the computing device from the terminal(s) (or depot(s)) to the DCMA(s). Once dispatched, the resource(s) follow the second route(s) until reaching starting location(s) for the first route(s). For example, each allocated vehicle may perform autonomous driving operations to follow a respective second route. Alternatively, a pilot manually drives or remotely controls driving operations of each vehicle until it reaches the DCMA. In this case, turn-by-turn directions can be output from output devices of the vehicle, a mobile communication device (for example, mobile communication device 156 of FIG. 1), and/or a computing device (for example, computing device 110 of FIG. 1). The output devices can include, but are not limited to, display screen(s), speaker(s) and/or vibration device(s). The present solution is not limited to the particulars of these examples.

In 516, the system optionally detects when the resource(s) reach the start location(s) of the first route(s). Various types of location data can be used to make this detection, such as GPS data and/or triangulation data. The resource(s) is(are) then caused to follow the first route(s) through the DCMA(s), as shown by 518. For example, each allocated vehicle may perform autonomous driving operations to follow a respective first route. Alternatively, a pilot manually drives or remotely controls driving operations of each vehicle through the DCMA. In this case, turn-by-turn directions can be output from output devices of the vehicle, a mobile communication device (for example, mobile communication device 156 of FIG. 1), and/or a computing device (for example, computing device 110 of FIG. 1). The output devices can include, but are not limited to, display screen(s), speaker(s) and/or vibration device(s). The present solution is not limited to the particulars of these examples.

In 520, the resource(s) is(are) caused to collect data while traversing the DCMAs. The data is collected in accordance with DCM goals and parameters. The DCM goals and/or parameters can be dynamically modified or otherwise adjusted during 520 in accordance with a novel technique which will be discussed in detail below in relation to FIGS. 6-9.

The robotic system(s) include a plurality of sensor(s) that continuously or periodically generate sensor data as the resource(s) follow(s) the first route(s). The sensor(s) can include, but are not limited to, location/GPS device(s), camera(s), radar/sonar device(s), environmental sensor(s), lidar device(s) and/or other sensor(s). The data collection by the robotic system(s) can be automatically started when the robotic systems enter the DCMAs. An occupant(s) of the robotic system(s) may be notified when the data collection begins. This notification can be auditory, visual and/or tactile. The notification can be provided via output devices of the robotic system(s), mobile communication device(s) and/or computing device(s). The occupant(s) (for example, individual 154 of FIG. 1) may additionally manually input information into the system during the DCM. For example, the occupant may add annotations to a displayed map. The present solution is not limited to the particulars of this example.

In some scenarios, the vehicle(s) may traverse the same road three or more times (for example, such as when a detour exists). As noted above, the first route may cause the vehicle to traverse a given road in both directions while data is being collected. The vehicle may be configured such that (i) the data collection operations thereof are temporarily suspended or disabled when the vehicle begins to traverse the given road an additional time (for example, a second time for a one-way road or a third time for a two-way road) and (ii) the data collection operations thereof are unsuspended or re-enabled when the vehicle completes traversal of the given road the additional time. This feature of the present solution reduces the amount of repetitive data collection during the DCM.

The collected data can optionally be used in 522 by the computing device(s) to track which parts of the first route(s) have been traversed by the resource(s) while successfully collecting data. The tracked information may be displayed in 524 on display device(s) of the robotic system(s), display device(s) of mobile communication device in occupant possession, and/or a display device of a remote computing device (for example, computing device 110 of FIG. 1). The tracked information may also be stored in a remote datastore (for example, datastore 112 of FIG. 1) and/or a local datastore (for example, memory 306, 310 of FIG. 3) of the robotic system(s), mobile communication device(s), remote computing device(s).

The data collection is discontinued in 526 in response to a trigger event. The trigger event can include, but is not limited to, a time when traversal of the first route(s) by the resource(s) is(are) completed, a time when the robotic system has come to a complete stop after traveling a certain distance, reception of a user-software interaction indicating that the DCM has been completed, detection of a malfunction or other operational fault of the robotic system(s), detection of a malfunction or other operational fault of sensor(s) of the robotic system(s), and/or expiration of a given period of time. An occupant(s) of the robotic system(s) may be notified when the data collection is discontinued or other stops. This notification can be auditory, visual and/or tactile. The notification can be provided via output devices of the robotic system(s), mobile communication device(s) and/or computing device(s).

526 can also involve causing the resource(s) to return to the terminal(s) (or depot(s)). The system can automatedly generate third route(s) for the resource(s) in the same or similar manner as the second route(s).

In 528, the collected data is used to (i) train machine learning model(s) to detect object and/or (ii) generate or update one or more maps. Techniques for training machine learning models are known. Techniques for generating and updating maps are also well known. Any known or to be known technique can be used here. The trained machine learning model(s) and/or map(s) is(are) then used in 534 to control operations of vehicle(s) (for example, vehicle 102 of FIG. 1) as described above (for example, in relation to FIG. 5). Subsequently, 532 is performed where method 500 ends or other operations are performed.

Figure 6:
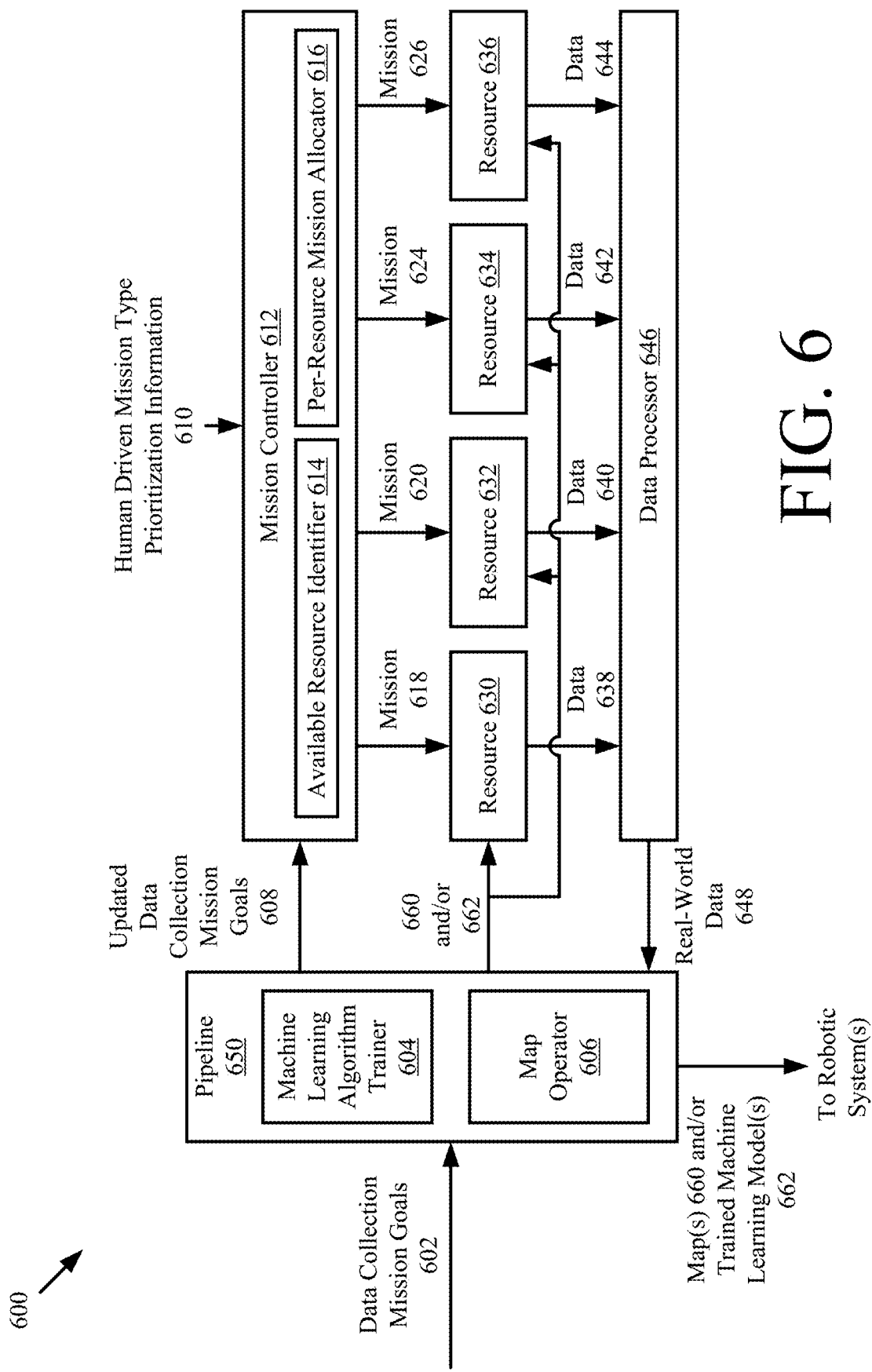
FIG. 6 provides a block diagram of a system configured to facilitate the dynamic updating of data collection missions.

FIG. 6 provides a block diagram of a system 600 configured to facilitate the dynamic updating of DCM goals and/or parameters. System 600 can be used in block 520 of FIG. 5 to facilitate data collection by resource(s) while traversing the DCMAs. All or some of the system 600 can be implemented in one or more computing devices (for example, on-board computing device 122 of FIG. 1, computing device 110 of FIG. 1, mobile communication device(s) 156 of FIG. 1, vehicle on-board computing device 220 of FIG. 2, and/or computer system 300 of FIG. 3).

System 600 comprises a pipeline 650, a mission controller 612, resource(s) 630-636, and a data processor 646. The pipeline 650 can include, but is not limited to, a machine learning algorithm trainer 604 and/or a map generator 606. System 600 can include more or less components than those listed. For example, in some scenarios, pipeline 650 comprises only one of the machine learning algorithm trainer 604 and a map operator 606 machine learning algorithm trainer 604. The present solution is not limited in this regard.

During operation, a user inputs DCM goals 602 into the pipeline 650 via user-software interaction(s) with a computing device (for example, computing device 110 of FIG. 1 and/or mobile communication device 156 of FIG. 1). A DCM goal may define types of targets for which data should be collected and the number of targets of each type for which data should be collected. The types of target objects (or target object types) can include, but are not limited to, vehicles, buses, pedestrians, cyclists, traffic signs, and/or traffic lights. The number of target objects can include any integer equal to or greater than zero.

The pipeline 650 uses real-world data 648 to update the DCM goals 602. For example, a user-defined DCM goal is to collect data for one hundred vehicle targets and fifty bus targets. The real-world data indicates that data has already been collected for forty vehicle targets and fifteen bus targets. Thus, the DCM goal is updated to aim for data to be collected for sixty vehicle targets and thirty-five bus targets. The present solution is not limited to the particulars of this example. The updated DCM goal(s) 608 is(are) provided to the mission controller 612.

At the mission controller 612, the DCM goal(s) 608 and other information are used to facilitate resource allocation to DCMs. The other information can include, but is not limited to, human driven mission type prioritization information 610. For example, a human driven mission type prioritization information can indicate that there are twenty vehicles which can each be used for ride sharing, package delivery and/or data collection. Ten vehicles are allocated to ride-sharing missions, and six vehicles are allocated to package delivery missions. The present solution is not limited to the particulars of this example. An available resource identifier 614 uses the human driven mission type prioritization information 610 to (i) determine that there are four vehicles available for DCMs and (ii) identifies which four of the twenty vehicles are available for DCMs. Identifiers for the four vehicles are then passed to a per-resource mission allocator 616. The per-resource mission allocator 616 performs operations to allocate DCM(s) 618-626 to one or more resource(s) 630-636 in accordance with the DCM goal(s) 608. Resource(s) 630-636 can be the same as or similar to robotic system(s) 152 of FIG. 1.

The resources 630-636 collect data 638-644 during the DCMs. The data 638-644 is communicated to a data processor 646 to generate the real-world data 648.

The real-world data 648 may also be used by a machine learning algorithm trainer 604 to train machine learning model(s) to detect object(s) in perception data. The trained machine learning model(s) 662 may be communicated to the resources 630-636 and/or other robotic system(s) (for example, vehicle 102 of FIG. 1) to facilitate operations thereof. The map operator 606 uses the real-world data 648 to generate or update map(s). The map(s) 660 may also be provided to the resources 630-636 and/or other robotic systems (for example, vehicle 102 of FIG. 1) to facilitate DCMs.

Figure 7:
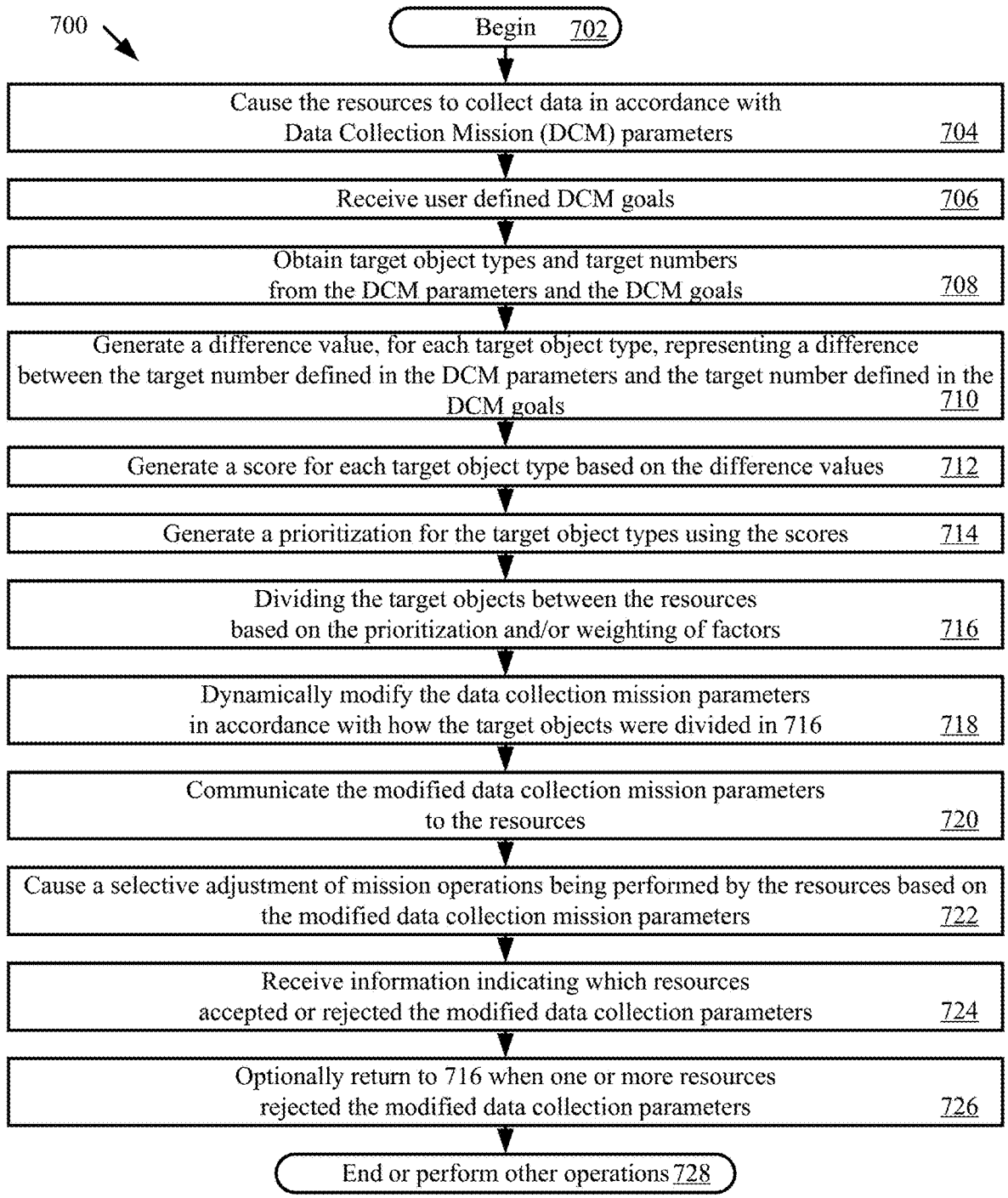
FIG. 7 provides a flow diagram of an illustrative method for dynamically updating data collection missions.

FIG. 7 provides a flow diagram of an illustrative method 700 for dynamically updating DCM goals and/or parameters while DCMs are being performed by resource(s) (for example, resource(s) 630-636 of FIG. 6). Method 700 can be performed by one or more computing devices (for example, computing device 110 of FIG. 1 and/or computer system 300 of FIG. 3).

Method 700 begins with 702 and continues with 704 where the resource(s) is(are) caused to collect data in accordance with DCM parameters. The DCM parameters can include, but are not limited to, types of targets for which data is to be collected and the number of targets of each type for which data is to be collected. The types of target objects (or target object types) can include, but are not limited to, vehicles, buses, pedestrians, cyclists, traffic signs, and/or traffic lights. The number of target objects can include any integer equal to or greater than zero.

In 706, the computing device receives user defined DCM goal(s) (for example, DCM goal(s) 602 of FIG. 6). The computing device then performs operations in 708 to obtain or otherwise extract certain target related information from the DCM parameters being used by the resource(s) and the user defined goal(s). The target related information includes, but is not limited to, target object types for which data should or is to be collected and target numbers of each target object type for which data should or is to be collected.

The target related information is used in 710 to generate difference value(s). In some scenarios, a difference value D can represent a difference between the target number specified in the DCM parameters for a particular target object type and the target number specified in the user-defined DCM goal(s) for the particular target object type. The difference value D can be defined by the following mathematical equation (1).

$$D = N_{target\text{-}goal} - N_{target\text{-}current} \qquad (1)$$

where $N_{target\text{-}goal}$ represents a target number specified in a user-defined DCM goal for a particular target object type and $N_{target\text{-}current}$ represents a target number specified in the DCM parameters for a particular target object type.

Figure 8:
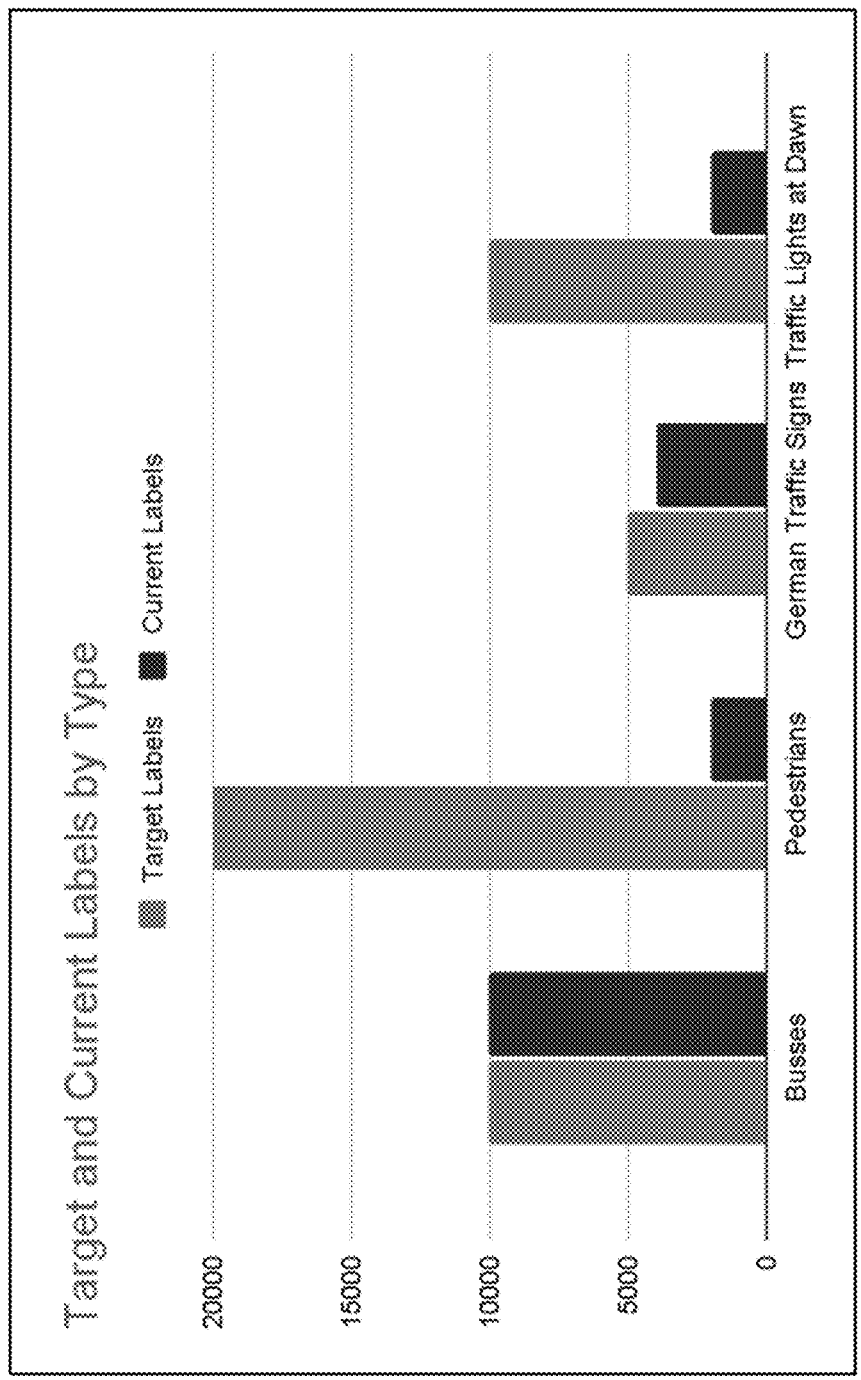
FIG. 8 provides a table that is useful for understanding target labels.

An illustration that is useful for understanding the difference value(s) is provided in FIG. 8. As shown in FIG. 8, DCM parameters specify that data is being collected for ten thousand buses, one thousand pedestrians, four thousand German traffic signs, and one thousand traffic lights at dawn. User-defined DCM goal(s) specify that data should be collected for ten thousand buses, twenty thousand pedestrians, five thousand German traffic signs, and ten thousand traffic lights at dawn. In this case, a first difference value is generated for busses and equals zero (i.e., 10,000−10,000=0). A second difference value is generated for pedestrians and equals nineteen thousand (i.e., 20,000−1,000=19,000). A third difference value is generated for German traffic signs and equals one thousand (i.e., 5,000−4,000=1,000). A fourth difference value is generated for traffic lights at dawn and equals nine thousand (i.e., 10,000−1,000=9,000). The present solution is not limited to the particulars of this example.

In 712, a score S is generated for each target object type based on a weighting of the difference values. The score can be defined by the following mathematical equation (2).

$$S = (w_1 D_1 + w_2 D_2 + \ldots + w_X D_X)/T \qquad (2)$$

wherein $w_1, w_2, \ldots, w_X$ are weights, $D_1, D_2, \ldots, D_X$ are difference values, and T is the total number of targets across all fields.

For example, with reference to FIG. 8, the weight for a given target object type is one and for all other target object types is zero. Thus, the score $S_{bus}$ for bus targets is 0%. The score $S_{pedestrian}$ for pedestrians is 65%. The score $S_{signs}$ for German traffic signs is 3%. The score $S_{lights}$ for traffic lights at dawn is 31%. The computations for these scores are defined by mathematical equations (3)—.

$$S_{bus}=(1 \cdot D_{bus}+0 \cdot D_{pedestrian}+0 \cdot D_{signs}+0 \cdot D_{ligts})/29000=0/29000=0 \quad (3)$$

$$S_{pedestrian}=(0 \cdot D_{bus}+1 \cdot D_{pedestrian}+0 \cdot D_{signs}+0 \cdot D_{ligts})/29000=19000/29000=65 \quad (4)$$

$$S_{signs}=(0 \cdot D_{bus}+0 \cdot D_{pedestrian}+1 \cdot D_{signs}+0 \cdot D_{ligts})/29000=1000/29000=3 \quad (5)$$

$$S_{lights}=(0 \cdot D_{bus}+0 \cdot D_{pedestrian}+0 \cdot D_{signs}+1 \cdot D_{ligts})/29000=9000/29000=31 \quad (6)$$

The present solution is not limited to the particulars of this example.

Referring back to FIG. 7, the scores are used in 714 to generate a prioritization for the target object types. The target object types may be prioritized in an order from the greatest score to the lowest score. For example, with reference to FIG. 8, pedestrians have the highest priority and busses have the lowest priority. The priority list for the target object types started with the highest priority is: pedestrians; traffic lights at dawn; German traffic signs; and busses. The present solution is not limited to the particulars of this example.

In 716, the targets are divided between the resources. In some scenarios, the targets are divided equally between the resources. In other scenarios, the targets are divided amongst the resources based on the prioritization of 714 and/or weighting factors. An algorithm can be used to facilitate the division of targets amongst the resources. The algorithm can include, but is not limited to, a CNN, a cost function and/or other algorithm. The weighting factors can include, but are not limited to, time of day, geographic location, geography, and/or partnership priorities. For example, certain data collection missions are only applicable during certain times of day or geographic locations. Four resources out of twenty resources are available for DCMs. Two of the four resources are located in Germany. So, only these two resources can be used to collect data for traffic signs located in Germany. The one thousand traffic lights are then divided between the two resources equally or unequally. The present solution is not limited to the particulars of this example.

Next in 718, the DCM parameter(s) for each resource is(are) modified in accordance with how the targets were divided amongst the resources in 716. For example, five hundred German traffic signs were assigned to a given resource. The corresponding DCM parameter for this resource is two hundred German traffic signs. Thus, this corresponding DCM parameter is changed from two hundred to five hundred. The present solution is not limited into the particulars of this example.

The modified DCM parameter(s) are then communicated to the resource(s) in 720. The resources are caused to selectively adjust their mission operations based on the modified DCM parameters, as shown by 722. Each resource is configured to accept or reject the modified DCM parameters, as shown by 724. The decision to accept or reject modified DCM parameters can be made based on on-board conditions. The on-board conditions can include, but are not limited to, minimum risk condition (MRC) state, and/or logger capacity. If a resource rejects the respective modified DCM parameters, the computing device is notified of the same and repeats operations 716-724 for re-dividing targets amongst the remaining resources available for DCMs, as shown by 726. Subsequently, 728 is performed where method 700 ends or other processing is performed.

Figure 9:
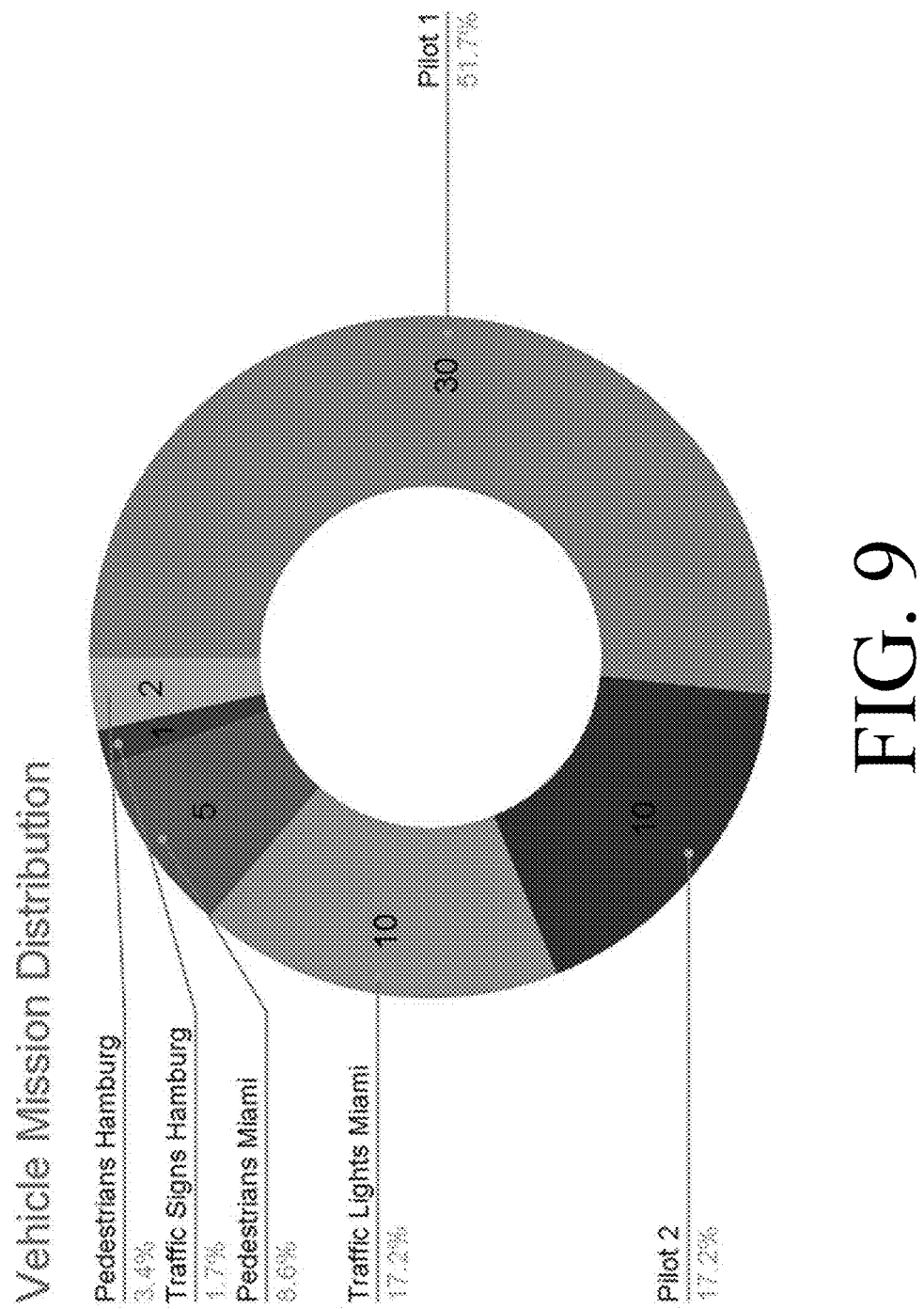
FIG. 9 provides a graph that is useful for understanding how targets are divided between resources for data collection missions.

FIG. 9 provides a graph that is useful for understanding how targets are divided between resources for two location specific DCMs in accordance with the present solution. Pilot 1 mission and Pilot 2 mission are needed to satisfy primary business needs (for example, revenue generation). Thirty vehicles are allocated for the Pilot 1 mission, and ten vehicles are allocated for the Pilot 2 mission. The remaining eighteen vehicles can be used to satisfy secondary business needs (for example, machine learning model training and/or map generation). Thus, DCMs are assigned to these eighteen available vehicles. Ten of the available vehicles are allocated for DCMs in which data is to be collected for traffic lights in Miami Florida Five of the available vehicles are allocated for DCMs in which data is to be collected for pedestrians in Miami Florida Two available vehicles are allocated for DCMs in which data is to be collected for pedestrians in Hamburg Germany, and one available vehicle is allocated for a DCM in which data is to be collected for traffic signs in Hamburg Germany. The present solution is not limited to the particulars of this example.

Figure 10:
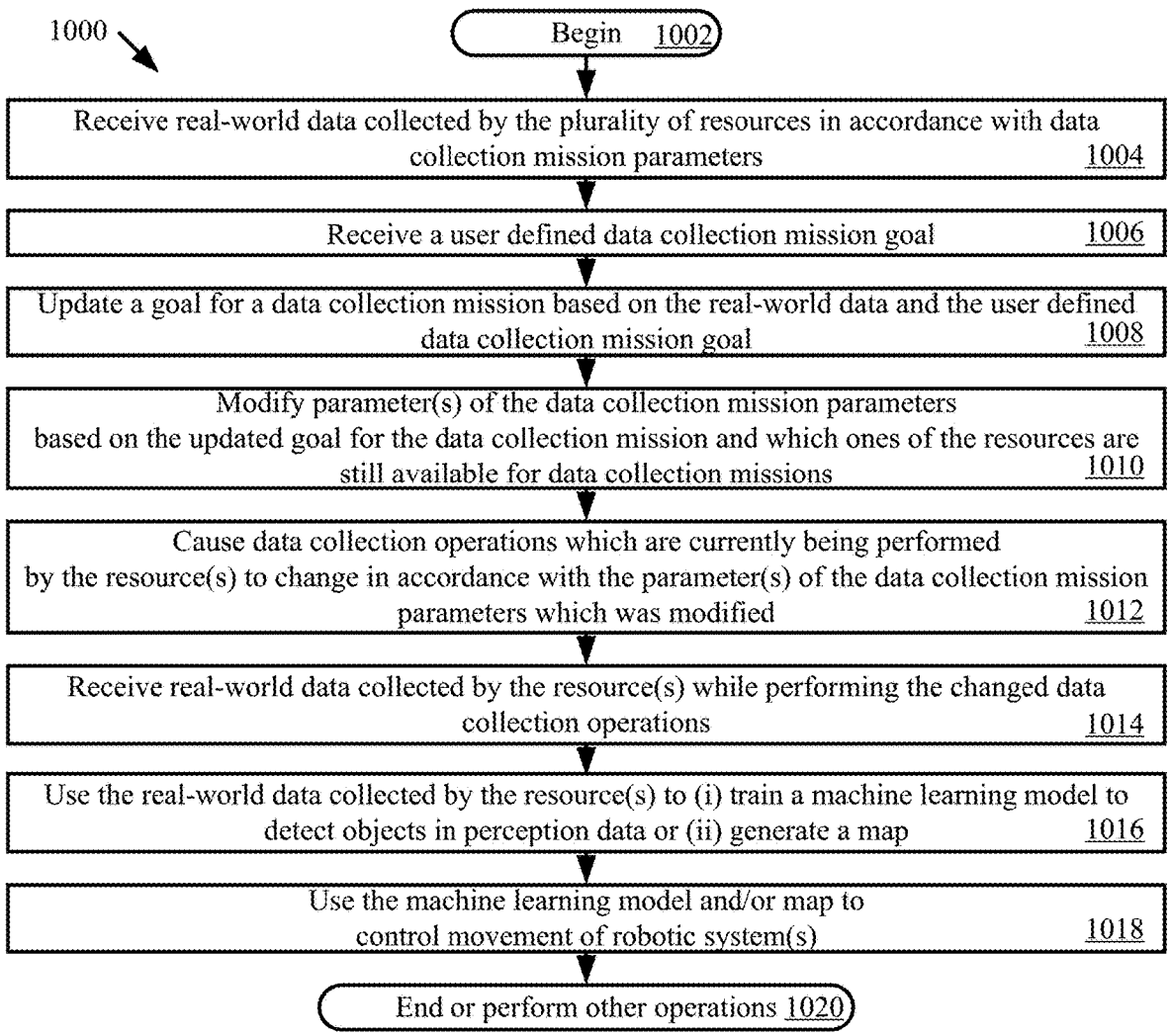
FIG. 10 provides a flow diagram of an illustrative method for controlling data collection by a plurality of resources.

FIG. 10 provides a flow diagram of an illustrative method 1000 for controlling data collection by resources (for example, robotic device(s) 152 of FIG. 1 and/or resource(s) 630-636 of FIG. 6). Method 1000 begins with 1002 and continues with 1004 wherein a computing device (for example, computing device 110 of FIG. 1, mobile communication device(s) 156 of FIG. 1 and/or computer system 300 of FIG. 3) receives real-world data collected by resources in accordance with DCM parameters. The DCM parameters can include, but are not limited to, target object types and a number of targets of each given target object type for which data is to be collected. The target object types can include, but are not limited to, vehicles, busses, pedestrians, animals, cyclists, traffic signs, traffic lights, crosswalks and/or other road features. The number of target objects comprise an integer equal to or greater than zero.

In 1006, the computing device receives a user defined DCM goal (for example, data collection mission goal 602 of FIG. 6). A goal for a DCM is updated by the computing device in 1008 based on the real-world data and the user defined DCM goal. The goal may be updated based on at least one value representing a difference between a first parameter of the DCM parameters and a second parameter specified in the user defined DCM goals. Each of the first and second parameters can include, but are not limited to, a number of targets of a given target object type for which data should or is to be collected.

In 1010, the computing device modifies one or more of the DCM parameters based on the updated goal for the DCM mission and which ones of the resources are still available for DCMs. This modification can be achieved by: generating a score based on the value(s) and/or a total number of targets for all target object types for which data is be collected; generating a prioritization of the target object types based on the score; dividing target objects between the resources based on at least the prioritization; and/or modifying the DCM parameter(s) in accordance with the dividing. In order to generate the score, the value may be weighted relative to at least one other value representing a difference between a third parameter of the DCM parameters and a fourth parameter specified in the user defined DCM goals.

In 1012, DCM operations (which are currently being performed by the resource(s)) are changed in accordance with the DCM parameter(s) which were modified. Subsequently, the computing device receives real-world data that is collected by the resource(s) while performing the changed DCM operations, as shown by 1014. In 1016, the real-world data is used to (i) train a machine learning model (for example, machine learning model(s) 180 of FIG. 1) to detect objects in perception data or (ii) generate map(s) (for example, map(s) 160 of FIG. 1). The trained machine learning model(s) and/or map(s) are used in 1018 to control movement of robotic systems(s) (for example, autonomous vehicle 102 of FIG. 1). Subsequently, 1020 is performed where method 1000 ends or other operations are performed (for example, return to 1002).

The implementing systems can comprise: a processor; and a non-transitory computer-readable storage medium comprising programming instructions that are configured to cause the processor to implement a method for operating an automated system. The above described methods can also be implemented by a computer program product comprising a memory and programming instructions that are configured to cause a processor to perform operations.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A method for controlling data collection by a plurality of resources, comprising:
   receiving, by a computing device, real-world data collected by the plurality of resources in accordance with data collection mission parameters, the data collection mission parameters comprising at least one of a first parameter being a target object type and a second parameter being a number of target objects for the target object type for which data is to be collected;
   receiving, by the computing device, a user defined data collection mission goal;
   updating, by the computing device, a goal for a data collection mission based on the real-world data and the user defined data collection mission goal, the goal being collection of data associated with a particular target object type of a plurality of different target object types;
   modifying, by the computing device, at least one of the first and second parameters of the data collection mission parameters based on the updated goal for the data collection mission and which ones of the plurality of resources are still available for data collection missions; and
   causing, by the computing device, data collection operations which are currently being performed by at least one of the plurality of resources to change in accordance with the at least one parameter of the data collection mission parameters which was modified.

2. The method according to claim 1, further comprising using the real-world data collected by the plurality of resources to (i) train a machine learning model to detect objects in perception data or (ii) generate a map.

3. The method according to claim 2, further comprising using at least one of the machine learning model or map to control movement of an autonomous vehicle.

4. The method according to claim 1, wherein the goal for the data collection mission is updated by generating at least one value representing a difference between one of the first and second parameters of the data collection mission parameters and a third parameter specified in the user defined data collection mission goals.

5. The method according to claim 4, further comprising generating a score based on the at least one value.

6. The method according to claim 5, wherein the at least one value is weighted relative to at least one other value representing a difference between a fourth parameter of the data collection mission parameters and a fifth parameter specified in the user defined data collection mission goals.

7. The method according to claim 5, further comprising generating a prioritization of the plurality of different target object types based on the score.

8. The method according to claim 7, further comprising dividing target objects between the plurality of resources based on at least the prioritization.

9. The method according to claim 8, wherein the at least one of the first and second parameters of the data collection mission parameters is modified in accordance with the dividing.

10. A system, comprising:
a processor;
a non-transitory computer-readable storage medium comprising programming instructions that are configured to cause the processor to implement a method for controlling data collection by a plurality of resources, wherein the programming instructions comprise instructions to:
receive real-world data collected by the plurality of resources in accordance with data collection mission parameters, the data collection mission parameters comprising at least one of a first parameter being a target object type and a second parameter being a number of target objects for the target object type for which data is to be collected;
receive a user defined data collection mission goal;
update a goal for a data collection mission based on the real-world data and the user defined data collection mission goal, the goal being collection of data associated with a particular target object type of a plurality of different target object types;
modify at least one of the first and second parameters of the data collection mission parameters based on the updated goal for the data collection mission and which ones of the plurality of resources are still available for data collection missions; and
cause data collection operations which are currently being performed by at least one of the plurality of resources to change in accordance with the at least one parameter of the data collection mission parameters which was modified.

11. The system according to claim 10, wherein the goal for the data collection mission is updated by generating at least one value representing a difference between one of the first and second parameters of the data collection mission parameters and a third parameter specified in the user defined data collection mission goals.

12. The system according to claim 11, wherein the programming instructions comprise instructions to generate a score based on at least one of the at least one value and a total number of targets for all target object types for which data is be collected.

13. The system according to claim 12, wherein the at least one value is weighted relative to at least one other value representing a difference between a fourth parameter of the data collection mission parameters and a fifth parameter specified in the user defined data collection mission goals.

14. The system according to claim 12, wherein the programming instructions comprise instructions to:
generate a prioritization of a plurality of different target object types based on the score;
divide target objects between the plurality of resources based on at least the prioritization; and
modify at least one of the first and second parameters of the data collection mission parameters in accordance with how the target objects are divided between the plurality of resources.

15. The system according to claim 10, wherein the programming instructions comprise instructions to use the real-world data collected by the plurality of resources to (i) train a machine learning model to detect objects in perception data or (ii) generate a map.

16. The system according to claim 15, wherein the programming instructions comprise instructions to use at least one of the machine learning model or map to control movement of an autonomous vehicle.

17. A non-transitory computer-readable medium that stores instructions that is configured to, when executed by at least one computing device, cause the at least one computing device to perform operations comprising:
receiving real-world data collected by the plurality of resources in accordance with data collection mission parameters, the data collection mission parameters comprising at least one of a first parameter being a target object type and a second parameter being a number of target objects for the target object type for which data is to be collected;
receiving a user defined data collection mission goal;
updating a goal for a data collection mission based on the real-world data and the user defined data collection mission goal, the goal being collection of data associated with a particular target object type of a plurality of different target object types;
modifying at least one of the first and second parameters of the data collection mission parameters based on the updated goal for the data collection mission and which ones of the plurality of resources are still available for data collection missions; and
causing data collection operations which are currently being performed by at least one of the plurality of resources to change in accordance with the at least one parameter of the data collection mission parameters which was modified.

* * * * *